(12) United States Patent
Kessler

(10) Patent No.: US 6,511,051 B2
(45) Date of Patent: Jan. 28, 2003

(54) ORDERED COLUMN PACKING WITH A FINE STRUCTURING

(75) Inventor: Alwin Kessler, Tuttwil (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 09/825,255

(22) Filed: Apr. 2, 2001

(65) Prior Publication Data

US 2001/0026876 A1 Oct. 4, 2001

(30) Foreign Application Priority Data

Apr. 4, 2000 (EP) .............................. 00810287

(51) Int. Cl.[7] .................................................. B01F 3/04
(52) U.S. Cl. ...................... 261/94; 261/112.2; 261/113; 261/DIG. 72; 422/239
(58) Field of Search ................................ 261/94, 112.1, 261/112.2, 113, DIG. 72; 422/190, 211, 239

(56) References Cited

U.S. PATENT DOCUMENTS

| | | | | |
|---|---|---|---|---|
| 4,186,159 A | * | 1/1980 | Huber | 261/112.2 |
| 4,740,334 A | * | 4/1988 | Rukovena, Jr. | 261/113 |
| 4,981,621 A | | 1/1991 | Pluss | |
| 5,171,544 A | | 12/1992 | Lang | |
| 5,188,773 A | * | 2/1993 | Chen et al. | 261/112.2 |
| 5,876,638 A | * | 3/1999 | Sunder et al. | 261/112.2 |

FOREIGN PATENT DOCUMENTS

| | | | | |
|---|---|---|---|---|
| EP | 0170402 A1 | | 2/1986 | |
| EP | 0293003 A1 | | 11/1988 | |
| EP | 0428265 A1 | | 5/1991 | |
| GB | 1341981 | * | 12/1973 | 261/112.2 |
| WO | WO 98/55221 | | 12/1998 | |

* cited by examiner

Primary Examiner—C. Scott Bushey
(74) Attorney, Agent, or Firm—Towsend and Townsend and Crew LLP

(57) ABSTRACT

An ordered column packing—in the form of packing layers containing flow channels (2)—has a foil-like material (1) with a fine structuring (10). The foil-like material is profiled with concave structure elements (3b; minus sign −) and convex structure elements (3a; plus sign +) in an alternating arrangement. An average distance "a" exists between centers of adjacent concave and convex structure elements respectively. This average distance "a" is substantially smaller than a distance between centerlines (20) of adjacent flow passages. The foil-like material has a second fine structuring in the form of regularly arranged apertures (5). An average distance "b" between centers of adjacent apertures is smaller than the average distance "a", preferably smaller by at least 50%; and edges (51, 52) of the apertures have in each case a shape including convex and concave locations (6a, 6b).

11 Claims, 2 Drawing Sheets

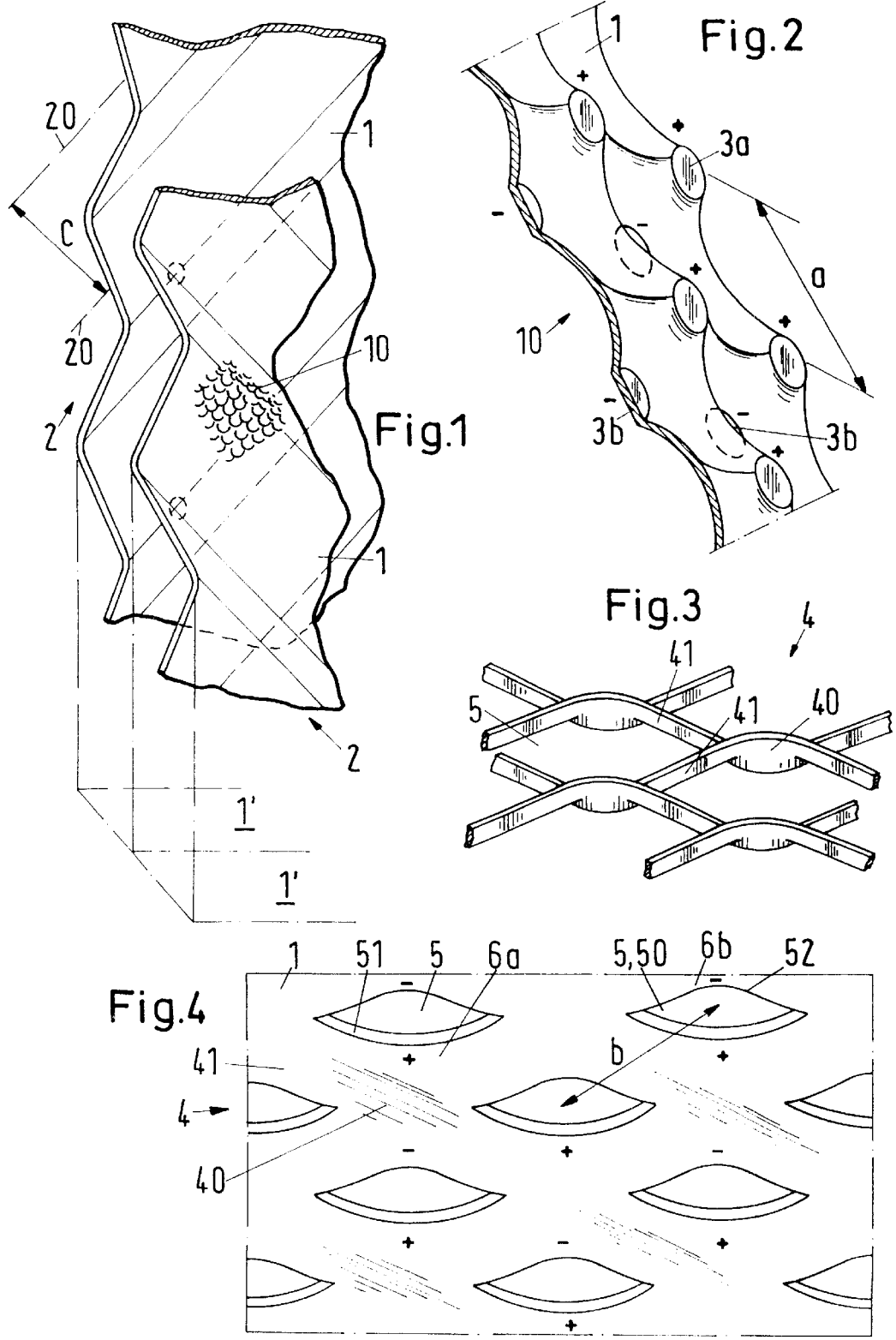

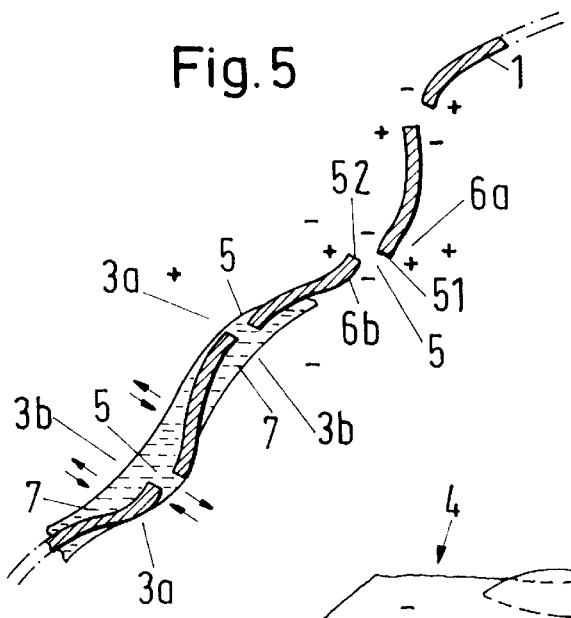
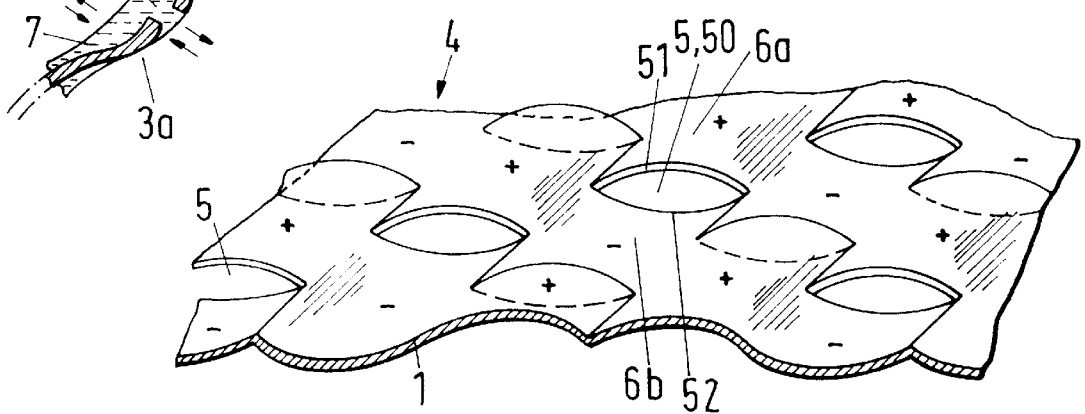
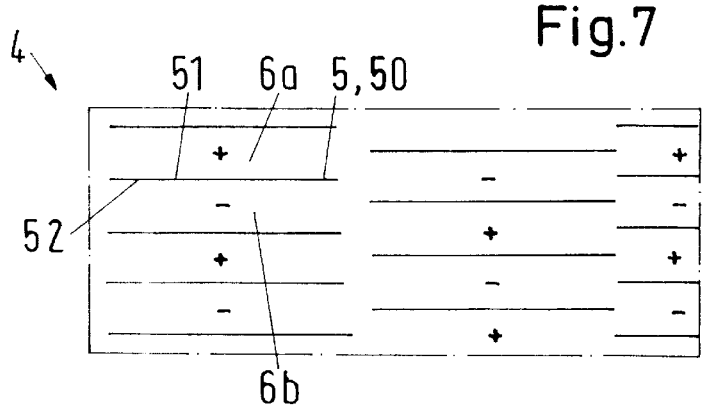

ORDERED COLUMN PACKING WITH A FINE STRUCTURING

BACKGROUND OF THE INVENTION

The invention relates to an ordered column packing with a fine structuring.

The ordered packing is provided for a column in which a material and heat exchange between a liquid which flows over the packing as a trickling film and a vapor or gas phase which flows in the opposite direction is carried out. The surface which is available through the packing body must be covered uniformly by the liquid phase at all points for a maximally developed exchange process. If the material of which the packing is manufactured consists of a metallic fabric, then capillary forces produce an excellent wetting of the surface when the dimensions of the woven metal wires are suitable. A less good but nevertheless usable wetting results in a substantially more economical packing body which is known from CH-A-664 091. This packing body consists of metal foils which have a fine structuring—formed by a network of crossing grooves. In this the grooves are formed through flanks of convex and concave structure elements—for example of pyramidal elevations and depressions. Thanks to the grooves the liquid is also distributed over the packing in the horizontal direction. Packings of expanded metal or rib mesh are also known which are intended to provide an economical substitute for metal fabrics, but by means of which a separation performance as in packings of metallic fabrics can not be achieved however due to their insufficient wettability.

SUMMARY OF THE INVENTION

It is an object of the invention to create an ordered packing which can be manufactured of a material which is more economical than metallic fabrics and is better wettable than the known metal foils or rib meshes.

The ordered column packing comprises—in the form of packing layers containing flow channels—foil-like material with a fine structuring. The foil-like material is profiled with concave and convex structure elements in an alternating arrangement. An average distance a exists between centers of adjacent concave and convex structure elements respectively. This average distance a is substantially smaller than a distance between centerlines of adjacent flow channels. The foil-like material has a second fine structuring which consists of regularly arranged apertures. An average distance b between centers of adjacent apertures is smaller than the average distance a, preferably smaller by at least 50%; and edges of the apertures have in each case a shaping comprising convex and concave locations.

In the following the invention will be explained with reference to the drawings.

BRIEF DESCRIPTION OF DRAWINGS

FIG. 1 shows parts of two layers of an ordered packing with a fine structuring,

FIG. 2 shows a profiled foil,

FIG. 3 shows a stretch grid,

FIG. 4 shows a stretch-grid-like foil,

FIG. 5 is a cross-section through a foil which is structured in accordance with the invention with a first and a second fine structuring, FIG. 6 shows a foil with a second fine structuring, and FIG. 7 is a plan view of a further foil with a second fine structuring.

DESCRIPTION OF THE PREFERRED EMBODIMENTS

FIG. 1 shows a part of two layers 1' of an ordered column packing which has a fine structuring 10. Each layer 1' consists of a foil-like material 1 and contains flow channels 2. An example pertaining to a fine structuring 10 of the foil-like material 1 is illustrated in FIG. 2 in enlargement. The foil 1 is profiled with convex structure elements (3a; marked with plus signs +) and concave structure elements (3b; minus signs −) in an alternating arrangement. Between centers of adjacent convex and concave structure elements 3a, 3b respectively there is an average distance a. This average distance a is substantially smaller than a distance c between centerlines 20 of adjacent flow channels 2.

In accordance with the invention the foil-like material has a second fine structuring which consists of regularly arranged apertures 5: see the embodiments of the following FIGS. 3 to 7 in which the apertures 5 are formed through repetitively arranged slits 50. An average distance b—see FIG. 4—between centers of adjacent apertures 5 is smaller than the average distance a; it is preferably smaller by at least 50%. The edges 51, 52 of the apertures 5 have a shaping which comprises in each case convex and concave locations 6a and 6b respectively (symbolized by + and −). On the reverse side of the foil 1 the convex locations 3a and 6a appear as concave ones and on the contrary the concave locations 3b and 6b appear as convex ones. The passage openings 5 which open up between the edges 51 and 52 of the slits 50 are in each case given as a result of a plastic reshaping.

Advantageously the structure elements 3a, 3b of the first fine structuring are arranged at the points of a first periodic point grid as well as the apertures 5 of the second fine structuring are arranged at the points of a second periodic point grid. The first fine structuring can also consist of a grooving in which a sequence of convex and concave structure elements, namely ridges and valleys, are present in only one direction.

An example of a second fine structuring, the apertures 5 of which are arranged at the points of a periodic point grid, is a stretch grid 4 with nodal regions 40 and internodal webs 41 such as is shown in FIG. 3. This stretch grid 4 must be formed to be very fine in order that a liquid which is to be treated in the column fills the apertures 5. It is difficult to manufacture a stretch grid 4 of this kind. Simpler to manufacture is the stretch-grid-like foil 4 of FIG. 4. Here the internodal webs 41 are relatively wide in comparison with the dimensions of the apertures 5.

The elementary cells of the first reference grid are for example square (FIG. 2). In stretch-grid-like foils 4 the apertures 5 have in each case a largest diameter, which are parallel to one another; these diameters are advantageously oriented in the direction of the diagonals of the named elementary cells.

A good material or heat exchange between liquid and vapor results through a cooperation of the capillary forces as a result of the two fine structurings. This cooperation is illustrated in FIG. 5. Each concave structure element 3b is filled with liquid 7, with the tendency to an accumulation in the central region existing as a result of the surface tension. On the convex reverse side 3a the liquid 7 has the tendency to withdraw and to drain the packing surface. This holds when only the first fine structuring is present. In a second fine structuring which is given in accordance with the invention the convex structure elements 3a or a portion of these structure elements 3a have apertures 5. The edges 51, 52 of the apertures 5 comprise concave locations 6b in accordance with the invention. At these locations 6b the liquid 7 which is located on the concave reverse side 3b forms a free liquid surface which noticeably contributes to the exchange process—symbolized by double arrows. If the grid definition of the apertures 5 (second point grid) is sufficiently fine with respect to a periodicity of the first fine structuring, then practically every convex structure element 3a carries an aperture 5 in its central region which contributes to an expansion of the free liquid surface.

FIG. 6 shows a foil 1 which is reshaped to form a structured foil 4 with a second fine structuring and in which cylindrical sub-areas form convex and concave locations 6a, 6b between adjacent, parallel slits 50. Through an alternating arrangement of these locations 6a, 6b, the edges 51 and 52 of the slits 50 form the apertures 5.

A further foil 4 with a similar second fine structuring is illustrated in FIG. 7 in plan view. The plus and minus signs again indicate the convex and concave locations 6a and 6b respectively.

The foil-like material 1 advantageously consists of a metallic alloy. The foil thickness lies in the range between 0.1 and 0.4 mm, preferably between 0.15 and 0.3 mm. The average distance b between adjacent apertures 5 amounts to from 0.3 to 2 mm. The relative proportion of the open cross-sectional areas which are given by the apertures 5 in relation to the total area of the foil-like material 1 lies in the range between 10 and 50%.

The packing in accordance with the invention is built up as a rule of a plurality of packing elements which are arranged one above the other. In a preferably used column packing each packing element is assembled from a large number of packing layers, with the flow channels of adjacent packing layers openly crossing one another: see FIG. 1.

It is also possible to build up a column packing heterogeneously, namely of packing layers 1' which consist of the foil-like material 1 and dissimilar packing layers (not illustrated) which in particular have a structure with porous double walls in which catalytically active substances are introduced. In this packing the packing layers which are formed by the foil-like material can also be formed as carriers of catalytically active substances.

What is claimed is:

1. Ordered column packing with a fine structuring, comprising foil material in the form of packing layers containing flow channels, the foil material being profiled with concave structure elements and convex structure elements in an alternating arrangement, there being an average distance "a" between centers of adjacent concave and convex structure elements respectively, the average distance "a" being substantially smaller than a distance between centerlines of adjacent flow channels, the foil material having a second fine structuring which consists of regularly arranged apertures, there being an average distance "b" between centers of adjacent apertures which is smaller than the average distance "a", edges of the apertures having in each case a shaping comprising convex and concave locations.

2. Packing in accordance with claim 1 wherein the apertures are formed by repetitively arranged slits, with a passage opening in each case being given between the edges of the slits as a result of a plastic reshaping.

3. Packing in accordance with claim 1 wherein the convex and concave structure elements of the first fine structuring are arranged at points of a first periodic point grid; and wherein the apertures of the second fine structuring are arranged at points of a second periodic point grid.

4. Packing in accordance with claim 3 wherein elementary cells of the first grid are square, the apertures have in each case a greatest diameter, and the greatest diameters are oriented in the direction of diagonals of the named elementary cells.

5. Packing in accordance with claim 1 wherein the foil material comprises a metallic alloy and has a thickness between 0.1 and 0.4 mm.

6. Packing in accordance with claim 5 wherein the average distance "b" between adjacent apertures amounts to from 0.3 to 2 mm.

7. Packing in accordance with claim 1 wherein in relation to the total area of the foil material the relative proportion of open cross-sectional areas which are given through the apertures lies in a range between 10 and 50%.

8. Packing in accordance with claim 1 comprising a plurality of packing elements arranged one above the other; wherein each packing element is assembled from a large number of packing layers; and wherein the flow channels of adjacent packing layers cross one another openly.

9. Packing in accordance with claim 1 built up heterogeneously of packing layers which comprise the foil material and dissimilar packing layers which have a structure with porous double walls in which catalytically active substances are introduced, and wherein it is possible for the packing layers which are formed of the foil material to be formed as carriers of catalytically active substances.

10. Packing in accordance with claim 1 wherein the average distance "b" is at least 50% smaller than the average distance "a".

11. Packing in accordance with claim 5 wherein the foil material has a thickness between 0.15 and 0.3 mm.

* * * * *